United States Patent [19]
Aigner

[11] Patent Number: 5,452,752
[45] Date of Patent: Sep. 26, 1995

[54] PRESSURE DEVICE FOR WOOD-MILLING MACHINES

[76] Inventor: Georg Aigner, Thannenmais, Reisbach 94419, Germany

[21] Appl. No.: 313,089

[22] PCT Filed: Oct. 30, 1993

[86] PCT No.: PCT/EP93/03034

§ 371 Date: Sep. 29, 1994

§ 102(e) Date: Sep. 29, 1994

[87] PCT Pub. No.: WO94/19148

PCT Pub. Date: Sep. 1, 1994

[30] Foreign Application Priority Data

Feb. 20, 1993 [DE] Germany .................. 43 05 356.4

[51] Int. Cl.⁶ .................. B27B 31/00; B27C 5/02
[52] U.S. Cl. .................. 144/253 F; 144/249 B; 144/253 R; 144/253 J; 83/444; 83/447; 83/450
[58] Field of Search .................. 83/422, 444, 446, 83/447, 448, 449, 450; 144/134 A, 242 R, 249 R, 249 A, 249 B, 253 R, 253 F, 253 J

[56] References Cited

U.S. PATENT DOCUMENTS

| | | | |
|---|---|---|---|
| 4,531,438 | 7/1985 | Poiez | 83/444 X |
| 4,662,413 | 5/1987 | Bater | 144/249 B |
| 4,715,089 | 12/1987 | Schema | 16/115 |
| 5,301,726 | 4/1994 | Wojcik | 144/253 J |
| 5,317,944 | 6/1994 | Hewitt | 83/447 |

FOREIGN PATENT DOCUMENTS

| | | |
|---|---|---|
| 0095733 | 12/1983 | European Pat. Off. . |
| 574780 | 7/1924 | France . |
| 1035349 | 12/1954 | Germany . |
| 3317270 | 11/1983 | Germany . |
| 9003963 | 6/1990 | Germany . |
| 78957 | 8/1951 | Norway .................. 144/249 B |
| 0354928 | 7/1961 | Switzerland . |

*Primary Examiner*—W. Donald Bray
*Attorney, Agent, or Firm*—Cohen, Pontani, Lieberman, Pavane

[57] ABSTRACT

The invention relates to a pressure device for wood-milling machines with an arm (32), which is attached to a bearing support (20), that can be pivoted around a horizontal axis (22) and adjusted in its longitudinal direction. The arm carries a vertically- and horizontally-adjustable pressure shoe, which acts upon the top of a work piece (18), as well as a vertically-adjustable guidance element (34), which presses the work piece (18) horizontally against a stop (16) and can be pivoted around a vertical axis. Single clamping rings (50) screwed onto external threads (42) are provided in order to arrest, respectively, the arm (32) set in its longitudinal direction, the pressure shoe (38) set vertically and horizontally, and the guidance element (34) set and swung horizontally.

16 Claims, 5 Drawing Sheets

PRESSURE DEVICE FOR WOOD-MILLING MACHINES

BACKGROUND OF THE INVENTION

1. Field of the Invention

The invention relates to a pressure device for wood-milling machines with an arm, attached to a bearing support, that can be pivoted around a horizontal axis and carries both a pressure shoe, which acts upon the top of the work piece and is vertically and horizontally adjustable, and a vertically adjustable guidance element, which presses the work piece horizontally against a stop and can be pivoted around a vertical axis.

2. Discussion of the Prior Art

Pressure devices of this type are known, for example, from the pamphlet entitled "SUVA Throat Protection Apparatus"("SUVA Kehlschutzapparat") issued by the Swiss Accident Insurance Company (SUVA) in February 1966. Here both the guidance element and the pressure shoe are attached to guide rods, which can be moved vertically in bearing blocks held on the arm. Clamping screws, which are screwed into each bearing block and act against rods attached to the arm, serve to lock the guidance element and the pressure shoe into the set vertical position. In addition, there are other clamping screws with which the selected position of the rods in the longitudinal direction of the arm can be fixed. And in order to set the angular position of the guidance element, there is an additional clamping screw via which the rods are attached to the arm, as a result of which an adjustment in the angle of the guidance element also leads to a turning of the pressure shoe.

SUMMARY OF THE INVENTION

The object underlying the invention is to provide a pressure device for woo-milling machines which, in comparison to the described prior art, has a much simpler design and requires significantly fewer clamping devices.

According to the invention, this object is attained in a pressure device of the type outlined above by virtue of the fact that the pressure shoe and the guidance element are attached to an arm that is constructed as a rod and runs, in such a way that the arm can be moved in a longitudinal direction, in a cylinder, which is attached pivotally to the bearing support, while single clamping rings screwed onto external threads are provided in order to arrest, respectively, the arm in its set longitudinal position, the pressure shoe in its set vertical and horizontal position, and the guidance element set and swung in the horizontal direction.

The invention provides a device that is much easier to grasp, the significantly simpler design of which permits simplified installation and easier operation. An essential fact here is that single clamping rings suffice, in each respective case, to set and arrest as needed the position of each settable part of the pressure device (the arm, the pressure shoe and the guidance element), whereas in known pressure devices a large number of clamping screws are needed, which have only one function each and entail higher operational expenditure.

In further embodiment of the invention, the pressure shoe and/or the guidance element is/are located on the lower end of a rectangular frame that is installed between two vertical guidance plates, which can be moved relative to one another in the longitudinal direction of the arm, in such a way that the height of the frame can be adjusted and the frame can be clamped by means of the clamping ring.

So that the pressure shoe can be arrested in the longitudinal direction of the arm and/or the arm can be arrested in its longitudinal direction, there are, according to another feature of the invention, wedge elements that are set into the radial recesses of a threaded bushing, which is placed coaxially on the arm and bears the external thread, and that can by means of the clamping ring be moved radially against the outer side of the arm on one slanted guide surface each.

It is especially advantageous to install the pressure shoe on its frame in such a way that the pressure shoe can be moved upward against an elastic force, so that the pressure shoe does not have to be resilient itself and will nonetheless always exert the necessary compressive force on the work piece.

According to another feature of the invention, both of the guide plates for arresting the height of the frame of the guidance element are attached to a pin, which is located at the free end of the arm and can be pivoted around a vertical axis, the free end of which bears the external thread for the clamping ring. At the end opposite to the external thread, the pin, which is preferably quadratic in cross-section, can be constructed as a fork that is attached to the free, flattened end of the arm so as to be pivotal around a pivot. So that a particular angular position of the frame of the guidance element can be arrested, the flattened end of the arm has an arc-shaped face with catching recesses that are engaged by a catching element on the fork, said catching element being pressed against the arc-shaped face of the arm via the two guide plates when the clamping ring is screwed tight.

In the following description, an example depicted in the illustrations is described.

DETAILED DESCRIPTION OF THE PREFERRED EMBODIMENTS

Figure 1:
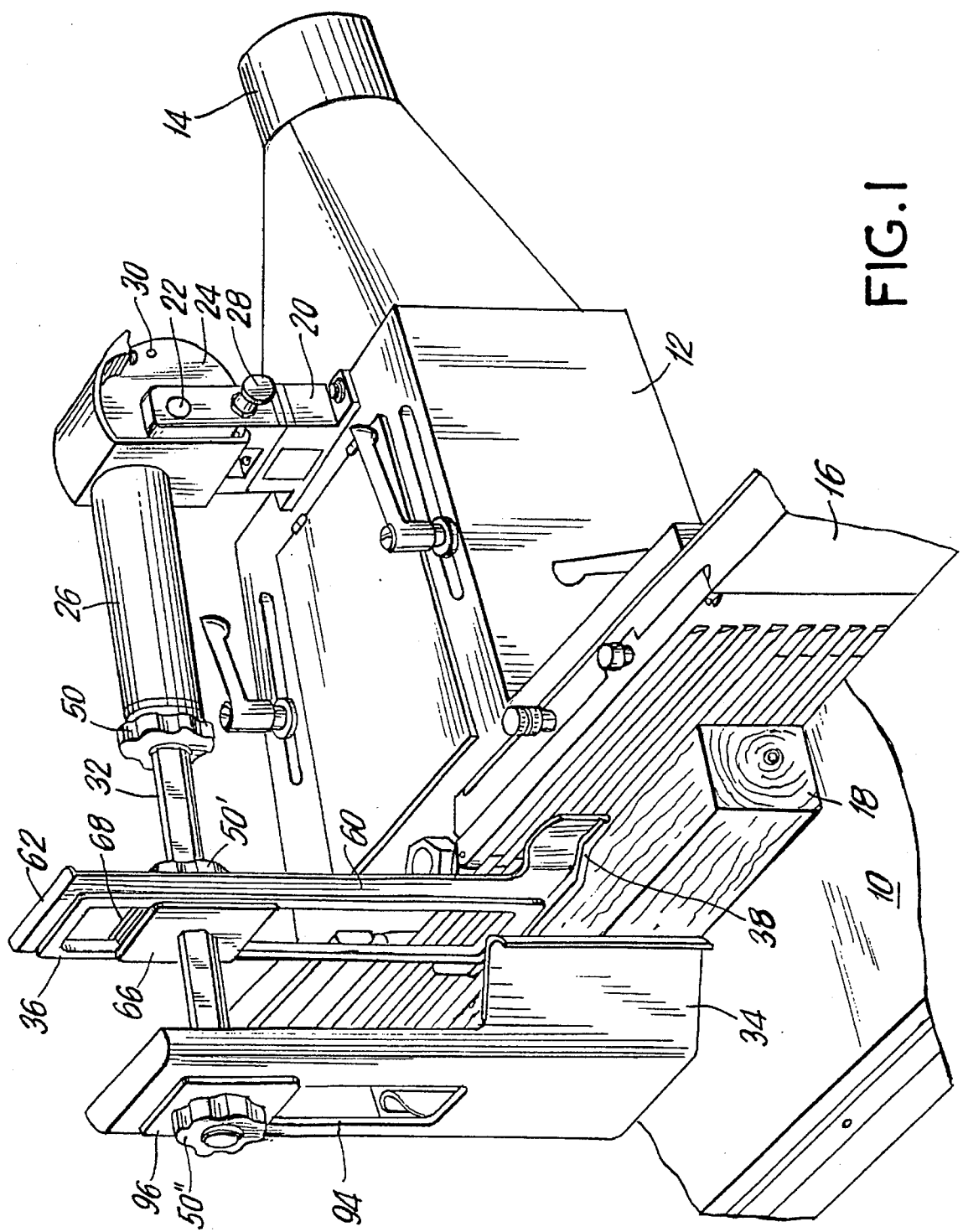
FIG. 1: A view of a pressure device in use on a wood-milling machine.

FIG. 1 indicates a housing 12 which is attached to a machine table 10 of a wood-milling machine and can be connected via a connection piece 14 to an extraction system and which covers the milling spindle not depicted here. On the front side of the housing 12 there is a stop 16 for guiding the work piece to be milled.

On the top of the housing 12 there is attached a bearing support 20, in which a bearing shield 24, from which extends a cylinder 26 that runs horizontally in the operating position of the pressure device shown in FIG. 1, is pivotally installed via a horizontal pivot 22. The cylinder 26 can be swung upward on its pivot 22 via the bearing shield 24, so that the pressure device is swung away from the work area. So that the pressure device can be arrested in this position and in its horizontal operating position, there is a locking button 28, the front end of which can be pressed into a corresponding locking hole 30 on the bearing shield 24.

An arm 32 with a hexagonal cross-section runs in the cylinder 26 in such a way that the arm can be moved in its longitudinal direction. On its front end, this arm 32 carries a guidance element 34, which is elastically designed in a known manner and which presses the work piece 18 horizontally against the stop 16. In addition, a rectangular frame 36, the height of which is adjustable, is attached to the arm 32 and bears on its lower end a pressure shoe 38, which acts upon the top of the work piece 18, thereby pressing the work piece firmly against the machine table 10.

Figure 2:
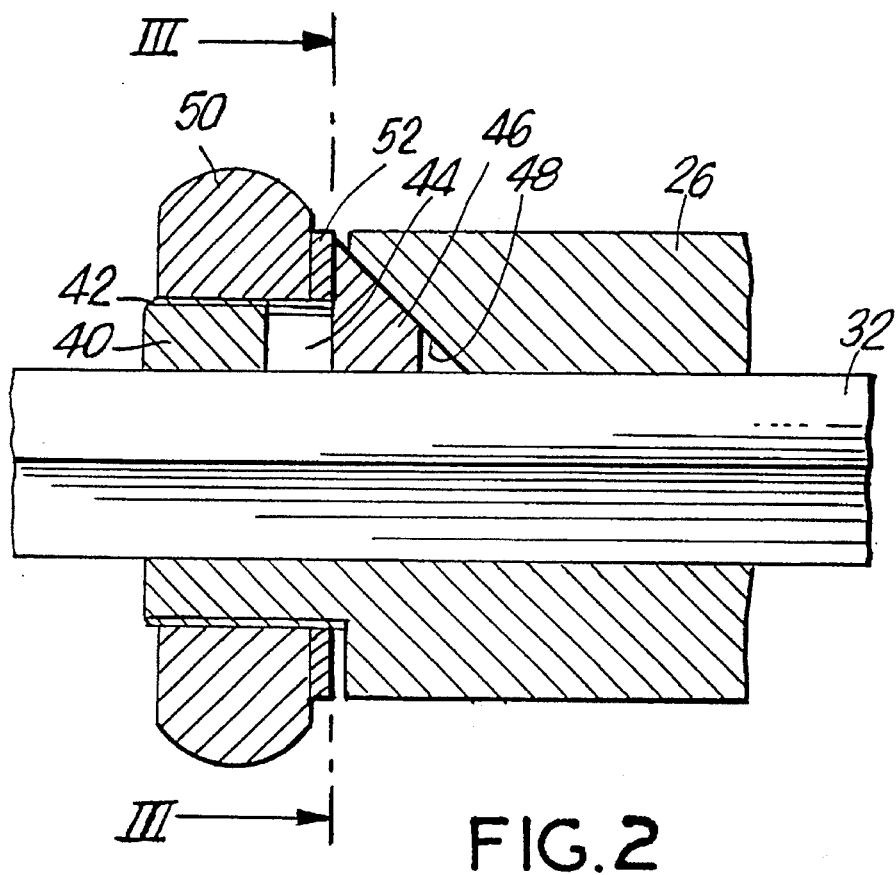
FIG. 2: A longitudinal section through the cylinder that is attached pivotally to the bearing support, with the longitudinally-moveable arm in the cylinder and the associated clamping ring.
Figure 3:
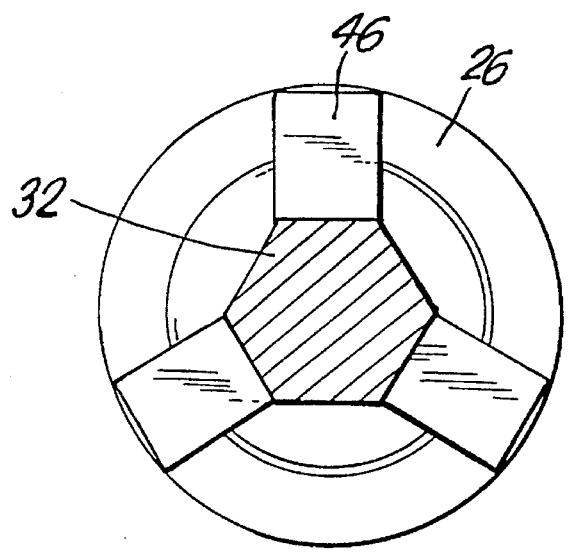
FIG. 3: A cross-section in Plane III—III as shown in FIG. 2.

As indicated in FIGS. 2 and 3, the end of the cylinder 26 opposite to the bearing support 20 is constructed as the thread bushing 40 with an external thread 42. Three radial recesses 44, distributed equidistant from one another around the perimeter and accommodating one wedge element 46 each, are worked into the thread bushing 40. The wedge surface of each wedge element 46 bears against an oblique guide surface 48 that is constructed at the inner end of each of the recesses 44 on the cylinder 26. A clamping ring 50 is screwed onto the external thread 42 of the thread bushing 40 and exerts equal pressure on each of the three wedge elements 46 via a washer 52. When the clamping ring 50 is tightened, it presses the wedge elements 46 axially against the oblique guide surfaces 48, whereby the wedge elements 46 are pressed radially against the corresponding outer surfaces of the arm 32. In this way, the arm 32 is clamped immovably in the position inside the cylinder 26 that has been selected for it.

Figure 4:
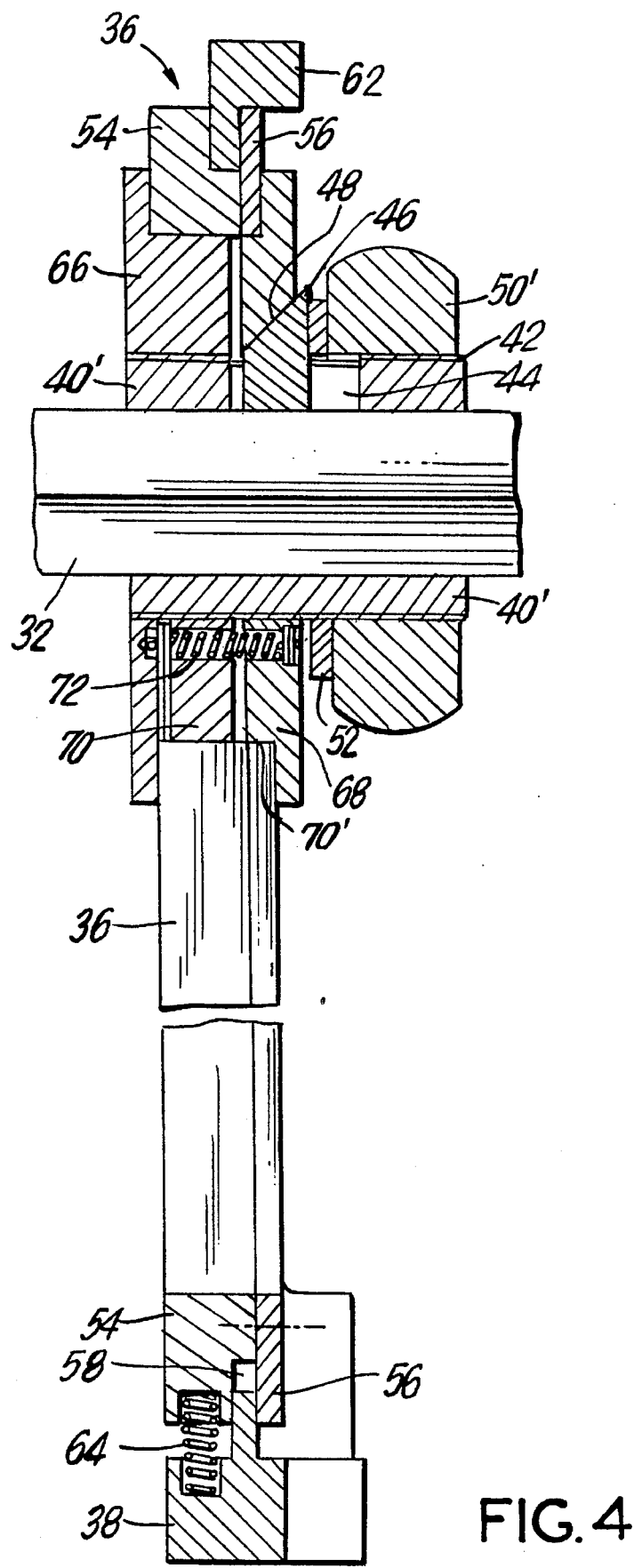
FIG. 4: A vertical section through the pressure shoe with the associated frame and clamping ring.

FIG. 4 shows a vertical section through the frame 36 (depicted in FIG. 1), which consists of a front frame part 54 and a back frame part 56 that is screwed on to the front frame part 54. The front frame part 54 has an opening, rectangular in cross-section, which runs around its outer perimeter and together with the screwed-on frame plate 56 forms a guide slot 58. In the two parallel guide slots 58 on the external vertical sides of the frame 36 run, in such a way that their height can be adjusted, the two vertical spars 60 of an external frame 62, the lower edge of which is constructed as a pressure shoe 38. Between the pressure shoe 38 and the lateral strut of the front frame part 54 opposite to it there is at least one compression spring 64, ensuring that the pressure shoe 38 presses in an resilient, springy manner against the work piece 18.

The frame 36 runs, in such a way that its height can be adjusted, between the two vertical guide plates 66, 68, which can be moved in relationship to one another in the longitudinal direction of the arm 32. On their opposing sides, the two guide plates 66, 68 have quadratic projections 70, 70', the dimensions of which correspond to the interior breadth of the frame 36, so that the frame 36 can be slid up and down with only slight play.

An external bushing 40' is screwed tightly into the guidance plate 66. This external bushing is seated on the arm 32 in such a way that the bushing can be moved in a longitudinal direction, but not rotated. Following the example of threaded bushing 40, threaded bushing 40' has three equidistant radial recesses 44, into each of which one of the wedge elements 46 is set. The wedge surface of each wedge element bears against the opposing oblique guide surface 48 on the guide plate 68. A clamping ring 50' is screwed on to the threaded bushing 40' and acts axially against the wedge element 46 via a washer 52.

When the position of the pressure shoe 38 is to be locked both in the longitudinal direction of the arm 32 and at a certain height, the clamping ring 50' is screwed tightly on to the thread bushing 40', so that the clamping ring simultaneously pushes the three wedge elements 46 radially inward via the washer 52 and clamps together the two guide plates 66 and 68. The frame 36 is thereby clamped between the guide plates 66 and 68 and, at the same time, the axial position of the frame 36, and thus of the pressure shoe 38, on the arm 32 is set.

Between the two guide plates 66 and 68 there is a tension spring 72, which continually draws the two guide plates 66 and 68 together with a slight tension. This prevents the frame 36, and thus the pressure shoe 38, from accidently falling down and possibly damaging the rotating tool when the clamping ring 50' is loosened.

Figure 5:
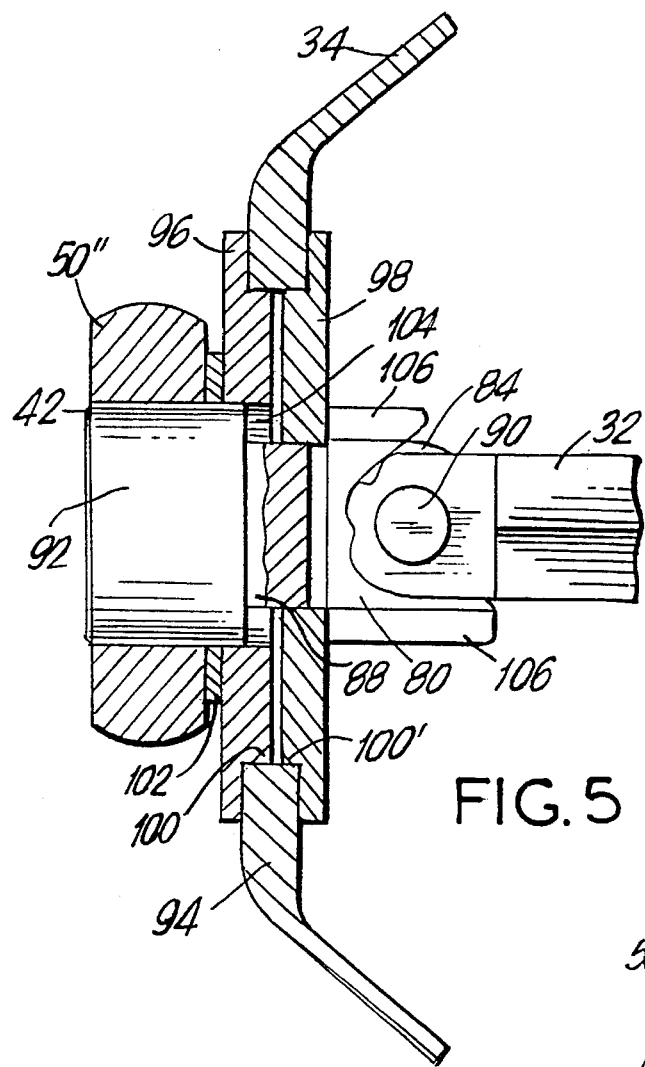
FIG. 5: A horizontal section through the frame of the guidance element with the associated clamping ring.
Figure 6:
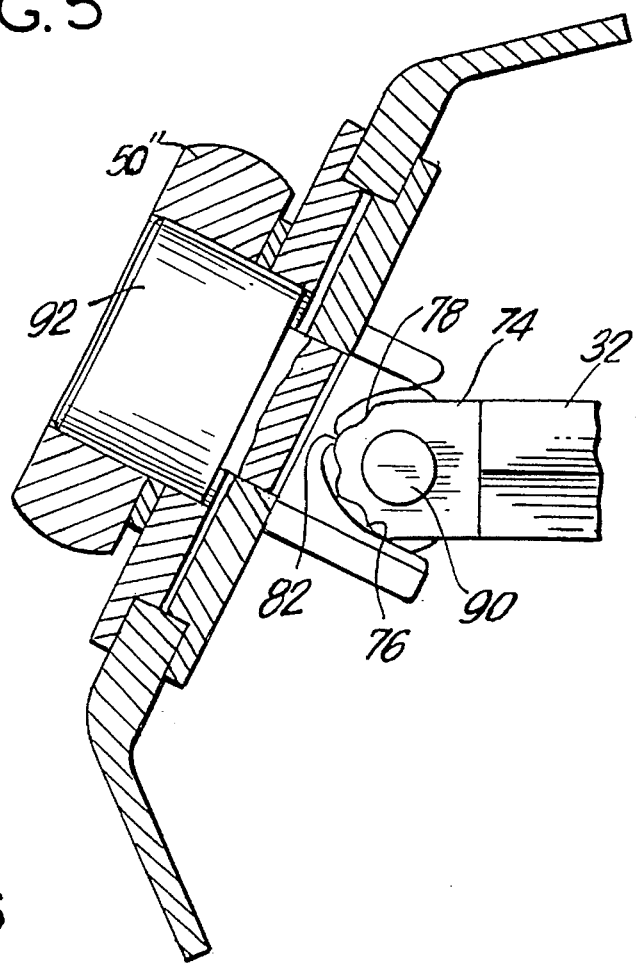
FIG. 6: A section corresponding to FIG. 5 during the swinging of the frame of the guidance element.
Figure 7:
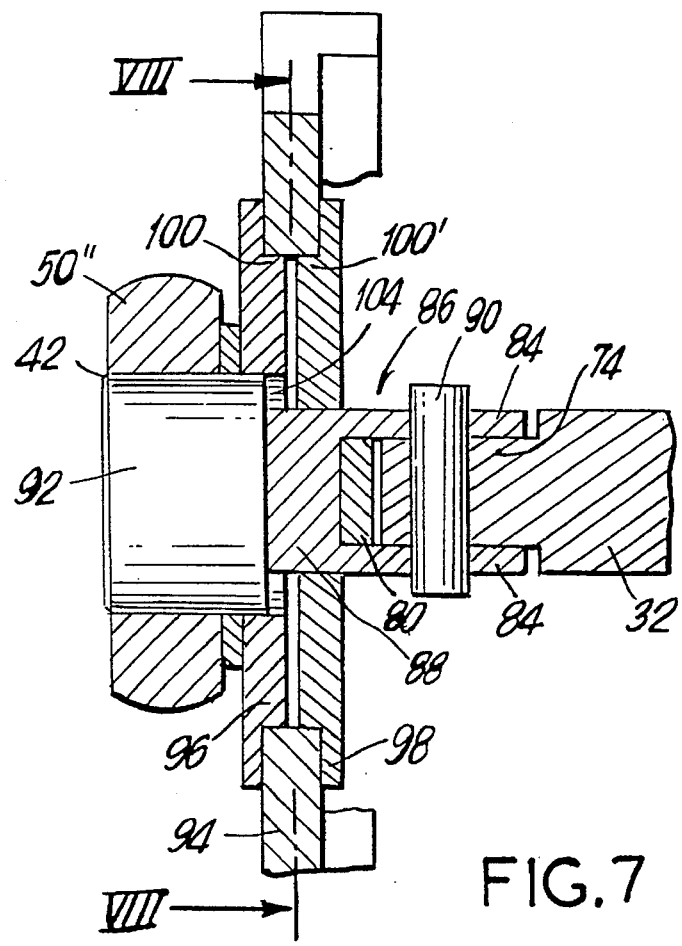
FIG. 7: A vertical section of the frame of the guidance element.
Figure 8:
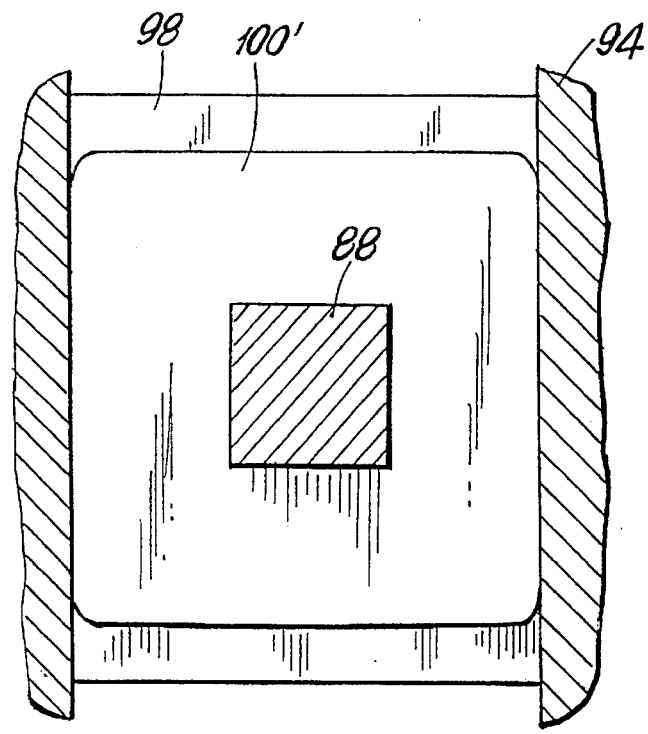
FIG. 8: A section in Plane VIII—VIII as shown in FIG. 7.

FIGS. 5 to 7 indicate that the free end 74 of the arm 32 is flattened and has an arc-shaped face 76, into the center of which and into the side of which the catching recesses 78 are worked. On the arc-shaped face 76 there is a roughly C-shaped catching element 80, which has in its center a catching lug 82 that can engage with the catching recesses 78.

The catching element 80 is located between the two parallel horizontal prongs 84 of the fork 86 constructed at the end of the pin 88, which has a quadratic cross-section and is pivotally attached with its two prongs 84 by means of a vertical pivot 90 to the flattened end 74 of the arm 32. The end of the pin 88 opposite to the fork 86 is constructed as the threaded bolt 92 with the external thread 42. The clamping ring 50" is screwed on to the external thread 42.

The guidance element 34 is constructed on the lower end of a rectangular frame 94, which runs, in such a way that its height can be adjusted, between the two vertical guide plates 96 and 98. Similar to the two guide plates 66 and 68, the two guide plates 96 and 98 have quadratic projections 100 and 100', respectively, which are located opposite to one another and in this way form a guide for the height-adjustable frame 94 that lies between the two guide plates 96 and 98. Guide plate 96 has a circular hole 104, which allows it to be attached to the threaded bolt 92 via the external thread 42, while guide plate 98 has a central quadratic opening, which is seated on the pin with a quadratic cross-section.

Clamping ring 50", when tightened on the threaded bolt 92, presses the guide plate 96 via a washer 102 against the guide plate 98, which bears against the opposing outer side of the catching element 80. The frame 94 is thereby clamped between the two guide plates 96 and 98 and arrested at it selected height. At the same time, the guide plate 98 presses the catching element 80 against the arc-shaped face 76 of the free end of the arm 32, so that the catching lug 82 engages with one of the two catching recesses 78 in keeping with the angular position of the pin 88. In this way, the selected angular position of the guidance element 34 is simultaneously arrested by means of the clamping ring 50".

The catching element 80 has, on both sides, raised shoulders 106, which overlap the prongs 84 of the fork 86; this ensures that the catching element 80 is taken along when the pin 88 is swung around the pivot 90.

To adjust the height of the frame 94 with the guidance element 34, it is enough to loosen the clamping ring 50" only slightly, so that the catching lug 82 remains engaged with its particular catching recess 78 and the angular position of the guidance element 34 does not change.

I claim:

1. A pressure device for pressing a workpiece against a stop in a wood-milling machine, comprising: an arm; bearing support means for supporting the arm so as to be pivotable about a horizontal axis; a pressure shoe connected to the arm so as to be vertically and horizontally adjustable and so as to act upon a top portion of the workpiece; a vertically-adjustable guide element connected to the arm so as to be pivotable about a vertical axis and so as to press the workpiece horizontally against the stop; a cylinder having one end pivotably hinged to the bearing support means, the arm being arranged within the cylinder so as to be longitudinally movable therein; and clamping ring means including internally threaded clamping rings for arresting, respectively, the arm in its longitudinal direction, the pressure shoe in vertical and horizontal directions, and the guide element in a horizontal and pivoted direction.

2. A pressure device as defined in claim 1, and further comprising a rectangular frame having a lower end on which the pressure shoe is connected, and still further comprising means for adjusting vertical position of the rectangular frame, said adjusting means including two vertical guide plates that are movable in relationship to one another in the longitudinal direction of the arm, the rectangular frame being arranged between the two vertical guide plates so that the guide plates can engage and hold the rectangular frame.

3. A pressure device as defined in claim 2, and further comprising means for pressing the two guide plates against the rectangular frame so as to arrest the vertical position of the rectangular frame.

4. A pressure device as defined in claim 3, wherein the pressing means includes at least one tension spring.

5. A pressure device as defined in claim 2, and further comprising a bushing having an external thread and defining radial recesses, the pressure device still further comprising wedge elements accommodated in the radial recesses of the bushing, the wedges being adapted to be radially movable by the clamping ring engaging the external threads of the bushing against an outer surface of the rods so as to arrest the pressure shoe in the longitudinal direction of the arm.

6. A pressure device as defined in claim 5, wherein the arm has a polygonal cross-section and the wedge elements are located equidistant from one another around the perimeter of the arm.

7. A pressure device as defined in claim 5, wherein the threaded bushing is located on an end of the cylinder opposite to the bearing support means, the wedge elements being engageable with oblique guide surfaces so as to be forced against the outer surface of the arm.

8. A pressure device as defined in claim 5, wherein one of the vertical guide plates has oblique guide surfaces for the wedge elements which guide surfaces define a central hole, the threaded bushing being adapted to extend outwardly from another of the guide plates and to grip into the central hole of the one guide plate.

9. A pressure device as defined in claim 8, wherein the pressure shoe is connected to the frame so as to be vertically movable, and further comprising spring means for resisting upward vertical movement of the pressure shoe.

10. A pressure device as defined in claim 9, wherein the rectangular frame has vertical outer sides provided with guide slots, and further comprising an outer frame having a lower edge formed by the pressure shoe, the outer frame having vertical spars that are vertically adjustable in the guide slots in the vertical outer sides of the rectangular frame.

11. A pressure device as defined in claim 1, and further comprising a rectangular frame having a lower end on which the guide element is connected, and still further comprising means for adjusting vertical position of the rectangular frame, said adjusting means including two vertical guide plates that are movable in relationship to one another in the longitudinal direction of the arm, the rectangular frame being arranged between the two vertical guide plates so that the guide plates can engage and hold the rectangular frame.

12. A pressure device as defined in claim 11, wherein the arm has a free end, and further comprising a pin hinged to the free end of the arm so as to be pivotable about a vertical axis, the pin having a free end with an external thread, one of the clamping rings being engageable with the external thread of the pin, the two vertical guide plates for arresting the vertical position of the rectangular frame of the guide element being attached to the pin.

13. A pressure device as defined in claim 12, wherein the pin has a rectangular cross section and a fork-shaped end opposite to the externally threaded end, the fork-shaped end being pivotably attached to the free end of the arm, the free end of the arm being flattened and having an arc-shaped face with recesses therein, the fork-shaped end of the pin having a catching element adapted for engagement with the recesses in the arc-shaped face of the arm so as to arrest an angular setting of the rectangular frame of the guide element when the clamping ring is screwed tight onto the external thread of the pin.

14. A pressure device as defined in claim 1, wherein the cylinder has a free end opposite the end pivotably hinged to the bearing support means, the free end of the cylinder defining an opening by way of which the arm enters the cylinder, the free end having oblique guide surfaces which peripherally surround the opening, and further comprising a threaded bushing arranged coaxially on the arm and defining radial recesses, the device still further comprising wedge elements accommodated in the radial recesses of the bushing, the bushing having an external thread and the clamping ring being engageable with the external thread of the bushing, the wedges being adapted to be radially movable by the clamping ring on the oblique guide surfaces against an outer surface of the arm so as to arrest the arm in its longitudinal direction.

15. A pressure device as defined in claim 14, wherein the arm has a polygonal cross-section and the wedge elements are located equidistant from each other around the perimeter of the arm.

16. A pressure device as defined in claim 14, wherein the threaded bushing is located on the end of the cylinder opposite to the bearing support means, the oblique guide surfaces being formed to engageably cooperate with the wedge elements.

* * * * *